(12) United States Patent
Daviss (10) Patent No.: US 7,907,151 B2
(45) Date of Patent: Mar. 15, 2011

(54) APPARATUS AND METHOD FOR ASSOCIATING NON-OVERLAPPING VISUAL OBJECTS WITH Z-ORDERED PANES

(75) Inventor: Jeffery Rodd Daviss, Port Coquitlam (CA)

(73) Assignee: Business Objects Software Ltd., Dublin (IE)

( * ) Notice: Subject to any disclaimer, the term of this patent is extended or adjusted under 35 U.S.C. 154(b) by 974 days.

(21) Appl. No.: 11/748,441

(22) Filed: May 14, 2007

(65) Prior Publication Data
US 2008/0288860 A1 Nov. 20, 2008

(51) Int. Cl.
*G09G 5/00* (2006.01)

(52) U.S. Cl. ........ 345/629; 345/631; 345/635; 345/637; 715/273; 715/276

(58) Field of Classification Search ................ 345/629, 345/630, 631, 634, 635, 636, 637, 639, 640, 345/641; 715/273
See application file for complete search history.

(56) References Cited

U.S. PATENT DOCUMENTS

| | | | | |
|---|---|---|---|---|
| 5,487,145 A | * | 1/1996 | Marsh et al. | 345/501 |
| 5,583,974 A | * | 12/1996 | Winner et al. | 345/422 |
| 5,990,904 A | * | 11/1999 | Griffin | 345/631 |
| 6,130,676 A | * | 10/2000 | Wise et al. | 345/619 |
| 6,266,068 B1 | * | 7/2001 | Kang et al. | 345/629 |
| 6,633,297 B2 | * | 10/2003 | McCormack et al. | 345/506 |
| 6,774,913 B1 | * | 8/2004 | Varga et al. | 345/629 |
| 7,280,120 B2 | * | 10/2007 | Ecob et al. | 345/611 |
| 7,663,620 B2 | * | 2/2010 | Robertson et al. | 345/419 |
| 7,692,831 B2 | * | 4/2010 | Nishikawa | 358/518 |
| 2003/0193512 A1 | * | 10/2003 | Komagata | 345/629 |
| 2004/0085559 A1 | * | 5/2004 | Danilo | 358/1.12 |
| 2004/0189656 A1 | * | 9/2004 | Moore | 345/589 |
| 2005/0206653 A1 | * | 9/2005 | Beaumont | 345/629 |
| 2006/0001681 A1 | * | 1/2006 | Smith | 345/629 |
| 2006/0203010 A1 | * | 9/2006 | Kirchner et al. | 345/629 |
| 2009/0102837 A1 | * | 4/2009 | Kang et al. | 345/419 |

* cited by examiner

*Primary Examiner* — Stephen S Hong
*Assistant Examiner* — I-Chan Yang
(74) *Attorney, Agent, or Firm* — Cooley LLP (57) ABSTRACT

A computer readable storage medium includes executable instructions to accept a set of document objects, wherein each document object is associated with a z-order. A document object in the set of document objects is passed to a pre-rendering region comprising a stack of one or more panes, wherein the document object is added in z-order. The document object is checked against each pane in the stack for document object overlap, beginning with a topmost pane, until a pane selected from one of a bottommost pane and an overlap pane is reached. The document object is associated with a pane selected from one of the bottommost pane and a pane above the overlap pane. The pane above the overlap pane is selected from one of a pane in the stack and a new pane added to the top of the stack.

7 Claims, 7 Drawing Sheets

APPARATUS AND METHOD FOR ASSOCIATING NON-OVERLAPPING VISUAL OBJECTS WITH Z-ORDERED PANES

BRIEF DESCRIPTION OF THE INVENTION

This invention relates generally to rendering visual objects. More particularly, this invention relates to organizing visual objects for optimization when rendering a document.

BACKGROUND OF THE INVENTION

Handling overlapping visual objects is an ongoing problem in rendering graphics. Overlapping visual objects can bloat file sizes and lengthen rendering times. There are existing optimization functions that can be used on groups of non-overlapping objects to minimize file size and rendering time. In view of this, it would be advantageous to provide a function that groups the visual objects, while retaining correct z-order, into sets of non-overlapping objects so that file size and rendering time optimizations man be used.

SUMMARY OF INVENTION

The invention includes a computer readable storage medium with executable instructions to accept a set of document objects, wherein each document object is associated with a z-order. A document object in the set of document objects is passed to a pre-rendering region comprising a stack of one or more panes, wherein the document object is added in z-order. The document object is checked against each pane in the stack for document object overlap, beginning with a topmost pane, until a pane selected from one of a bottommost pane and an overlap pane is reached. The document object is associated with a pane selected from one of the bottommost pane and a pane above the overlap pane. The pane above the overlap pane is selected from one of a pane in the stack and a new pane added to the top of the stack.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following terminology is used while disclosing embodiments of, the invention:

A document object is a piece of visible content (e.g., a portion of text, a visualization, a header or footer, a table, a watermark, a graphic) in a document.

A pane is a virtual layer in a document rendering. A pane is associated with one or more non-overlapping document objects. The level of a pane in a stack of panes determines whether its associated objects appear above or below objects in other panes that overlap them in the document rendering.

An overlap pane is a pane containing a document object that is configured to be partially or entirely covered by a document object with a higher z-order value.

A pre-rendering region is a stack of one or more panes comprising a temporary document. The pre-rendering region is typically stored in a volatile memory location and its contents are not maintained after the document has been rendered to its new location. The pre-rendering region is not visible to a user.

Z-order is the sequence of overlapping two-dimensional objects such as windows in a Graphical User Interface or document objects in a report. When two objects overlap, the z-order determines which object should appear on top of the other. The object with the higher z-order appears on top.

Figure 1:
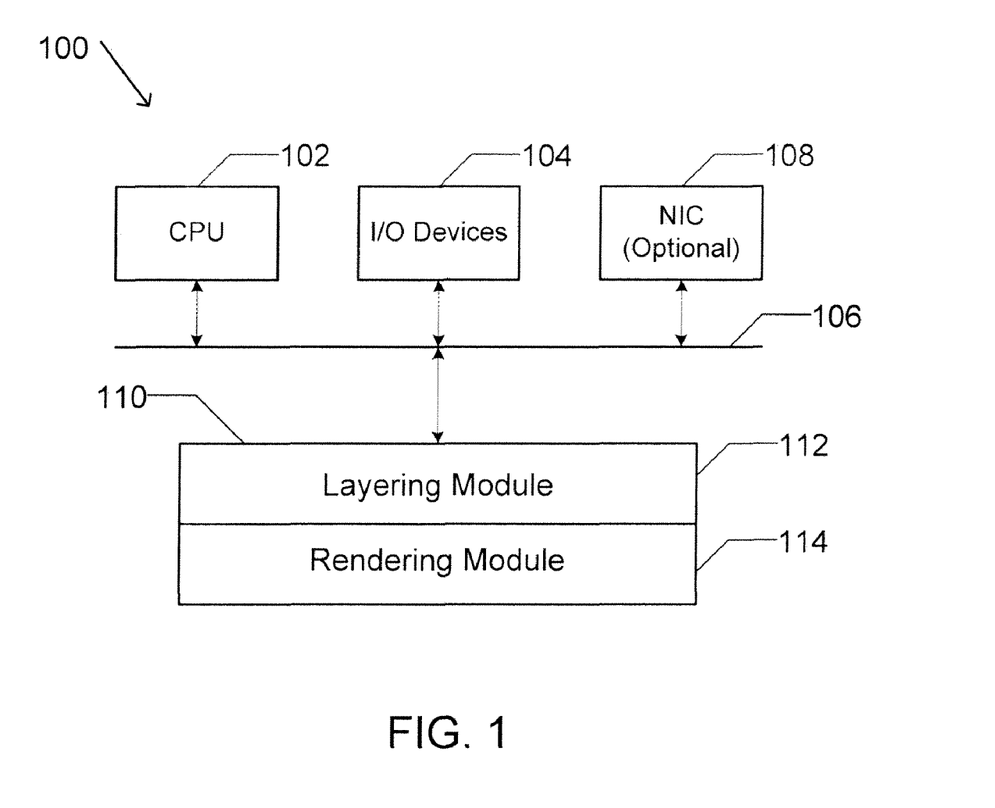
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input output devices 104 may include a keyboard, mouse, touch screen, monitor, printer, and the like. A network interface circuit 108 is also connected to the bus 106. The network interface circuit (NIC) 108 provides connectivity to a network (not shown), thereby allowing the computer 100 to operate in a networked environment.

A memory 110 is also connected to the bus 106. In an embodiment, the memory 110 stores one or more of the following modules: a layering module 112 and a rendering module 114. The layering module 112 accepts document objects, checks for overlap of document objects and associates them with layered panes. The rendering module 114 renders the layered document objects in their specified order, optimizing for render time, file size and the like.

The executable modules stored in memory 110 are exemplary. An operating system module and a Graphical User Interface (GUI) module may be included. It should be appreciated that the functions of the modules may be combined. In addition, the functions of the modules need not be performed on a single machine. Instead, the functions may be distributed across a network, if desired. Indeed, the invention may be implemented in a client-server environment with various components being implemented at the client-side and/or the server-side. It is the functions of the invention that are significant, not where they are performed or the specific manner in which they are performed.

Figure 2:
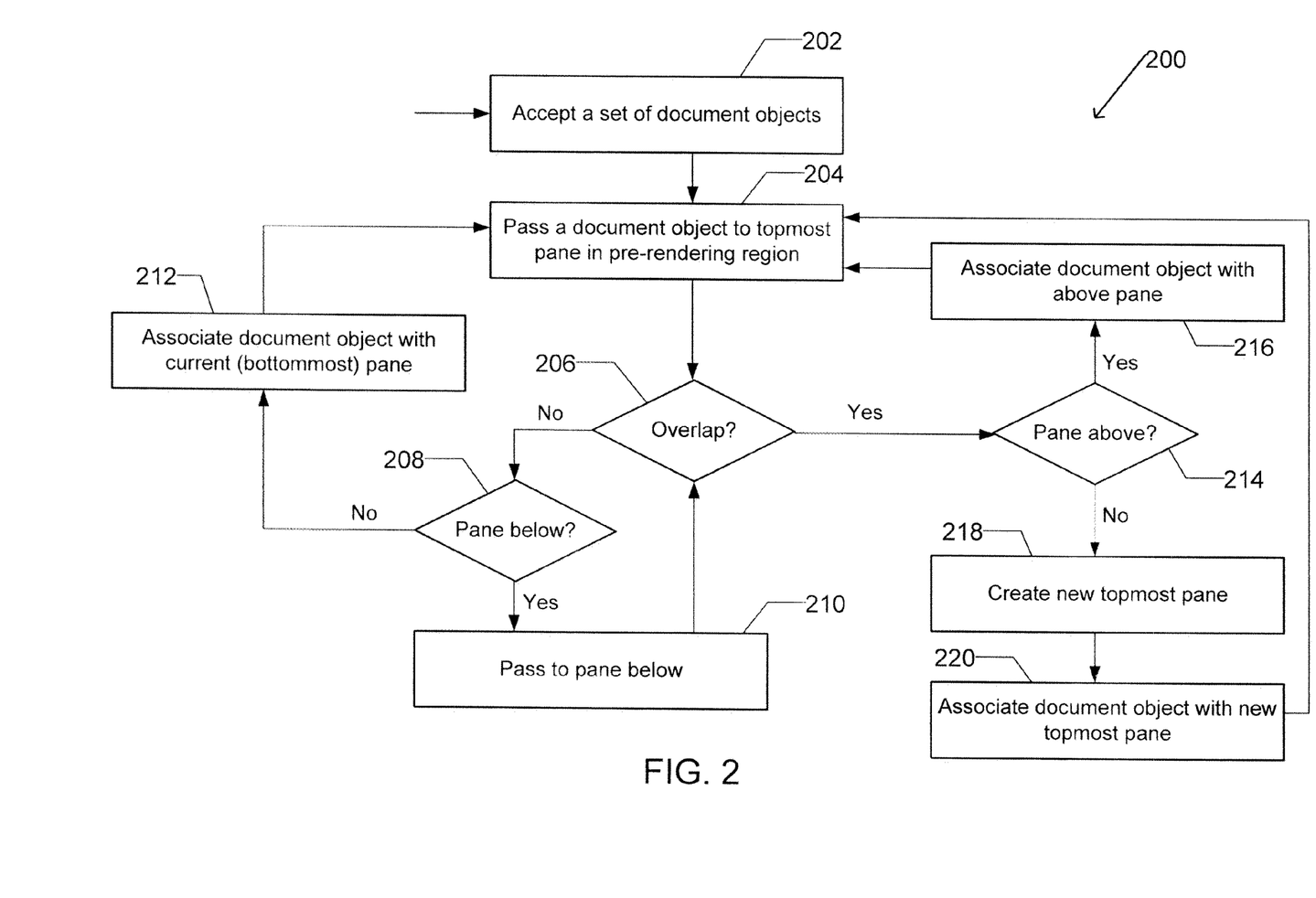
FIG. 2 illustrates processing operations associated with an embodiment of the invention.

FIG. 2 illustrates a high level workflow 200 associated with an embodiment of the invention. The first processing operation is for the layering module 112 to accept a set of document objects 202. The layering module 112 then passes one document object at a time to the topmost pane of a pre-rendering region 204. The layering module 112 checks to see if the document object overlaps with any document objects already associated with the current pane 206. If the document object does not overlap another document object, 206—No, and the current pane is not the bottommost pane, 208—Yes, the document object is passed to the pane below the current pane 210. The layering module 112 checks for overlap with document objects on that pane 206. If the document object does not overlap another document object, 206—No, but there are no other panes below the current pane (i.e., the current pane is the bottommost pane), 208—No, then the layering module associates the document object with the current (bottommost) pane 212 and passes the next document object to the topmost pane 204.

If the document object does overlap another document object in the current pane, 206—Yes, and there is a pane above the current pane (i.e., the current pane is not the topmost pane) 214—Yes, then the layering module 112 associates the document object with the pane above the current pane 216 and passes the next document object to the topmost pane 204.

If the document object overlaps another document object in the current pane, 206—Yes, and there is not a pane above the current pane (i.e., the current pane is the topmost pane), 214—No, then the layering module 112 creates a new pane and adds it to the top of the stack of panes 218. Then the layering module 112 associates the document object with the new topmost pane 220 and passes the next document object to the topmost pane 204. The workflow completes when there are no more document objects available.

In an embodiment, overlap detection is facilitated by an interval array along the y-axis of each pane. An interval array is an array that records intervals of the y-axis that contain document objects. Each pane in the pre-rendering region has its own interval array which tracks all document objects associated with its pane and all panes below it. A potential overlap occurs when a document object is inserted and its span intersects with a known span. At that point, the document objects that contribute to the y-axis span(s) of the interval array are checked against the incoming document object to see if there is overlap on both the x-axis and y-axis spans. That is, the document objects are checked to see if they actually overlap. If not, then the document object is added to the list of document objects, and the interval array's span is modified accordingly (for example, if a document object is partially within the span, the span on the interval array may grow). The span update may cause multiple spans to merge.

Figure 3:
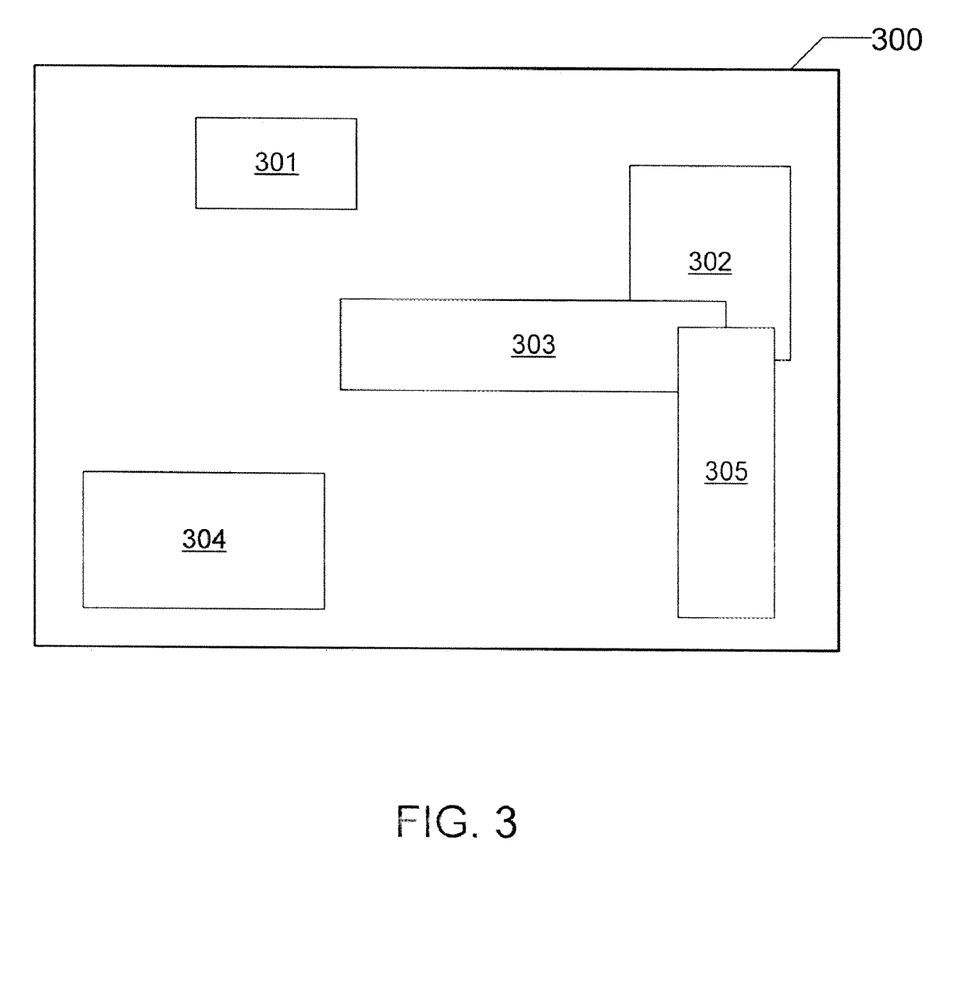
FIG. 3 illustrates a document object layout associated with an embodiment of the invention.

FIG. 3 illustrates the layout of a set of document objects (e.,g., text, charts, tables, maps, watermarks, graphics) 301-305 in a document (erg., a report, a text file, a spreadsheet, a diagram) 300 associated with an embodiment of the invention. It this example, each document object 301-305 has an increasing z-order as a function of its numeric value. Thus, document object 301 has the lowest z-order and document object 305 has the highest.

Figure 4:
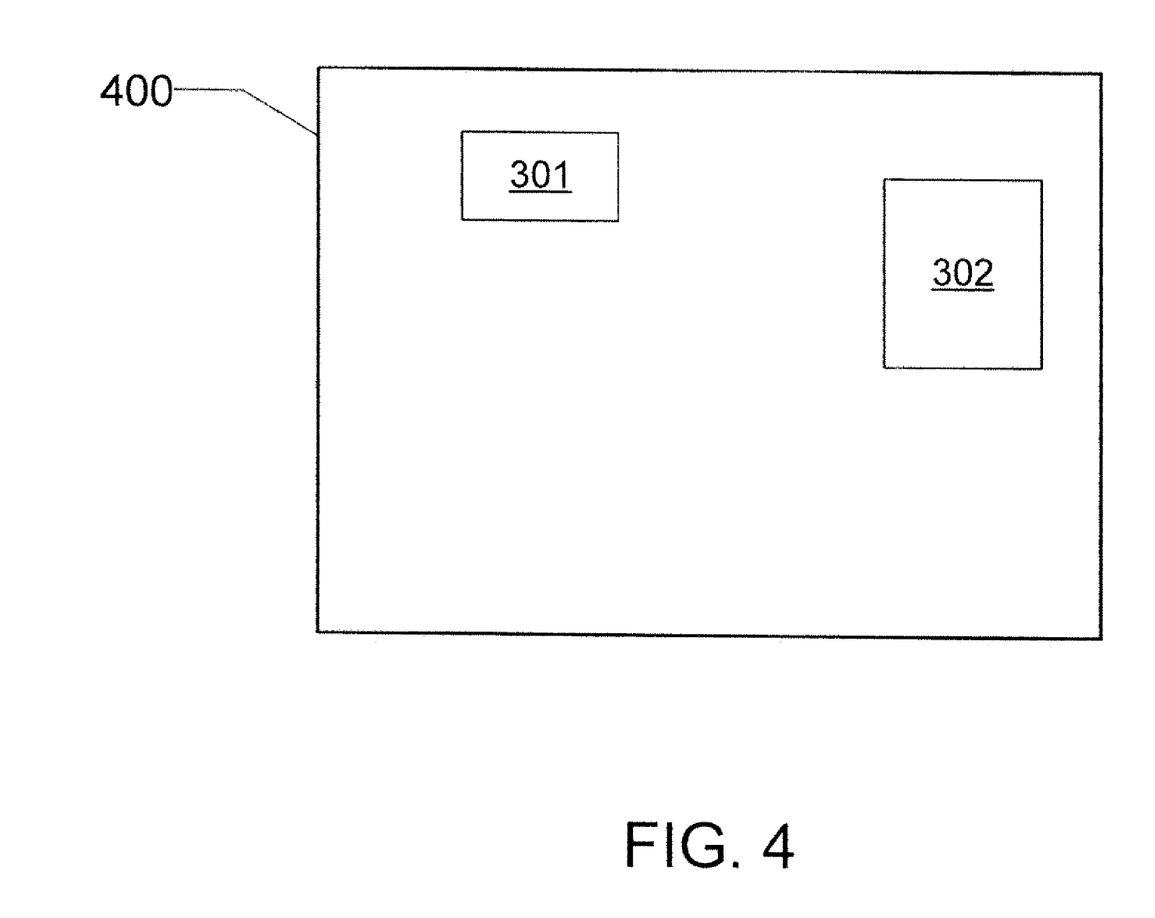
FIG. 4 illustrates an initial pane of the pre-rendering region configured in accordance with an embodiment of the invention.

FIG. 4 illustrates a pane 400 containing document objects 301 and 302 of FIG. 3 configured in accordance with an embodiment of the invention. The pane 400 is the initial pane of the pre-rending region. As non-overlapping document objects are passed to the pre-rendering region, they are associated with the initial pane 400. Here, document objects 301 and 302 are associated with the initial pane 400. In an embodiment, the first document object 301 is automatically associated with the initial pane 400.

Figure 5:
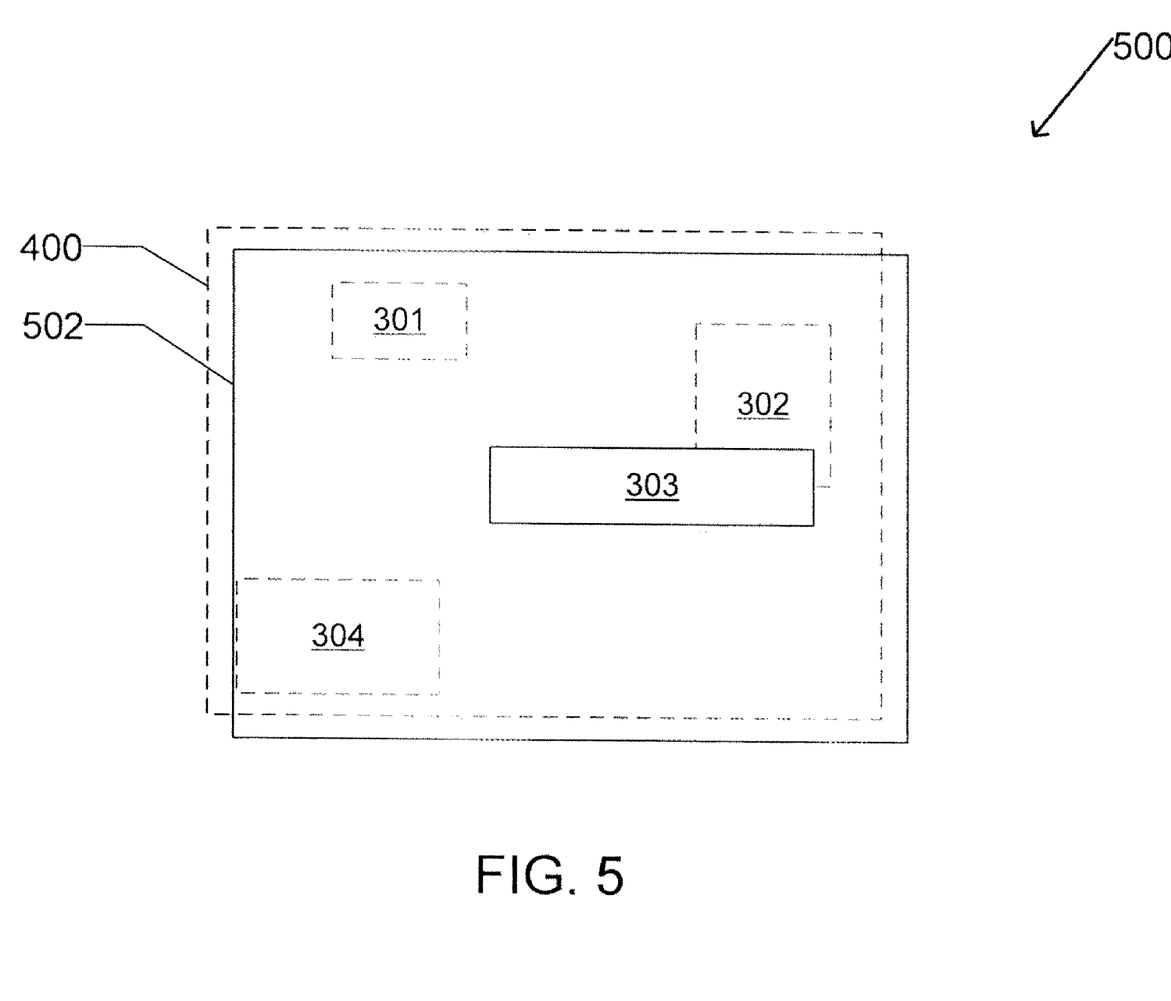
FIG. 5 illustrates a stack of panes including the initial pane of FIG. 4 configured in accordance with an embodiment of the invention.

FIG. 5 illustrates a set of panes 500 including the pane 400 of FIG. 4. In an embodiment, when the document object 303 is passed to the pre-rendering region, it is found to overlap the document object 302 and a new pane 502 is created. The document object 303 is then associated with the new pane 502. The document object with the next highest z-order 304 is passed to the topmost pane 502 of the pre-rendering region. Because the document object 304 does not overlap any document objects associated with the pane 502, it is passed to the pane 400 below. The document object 304 does not overlap any document objects in the pane 400, and the pane 400 is the bottommost pane, so the document object 304 is associated with the pane 400.

Figure 6:
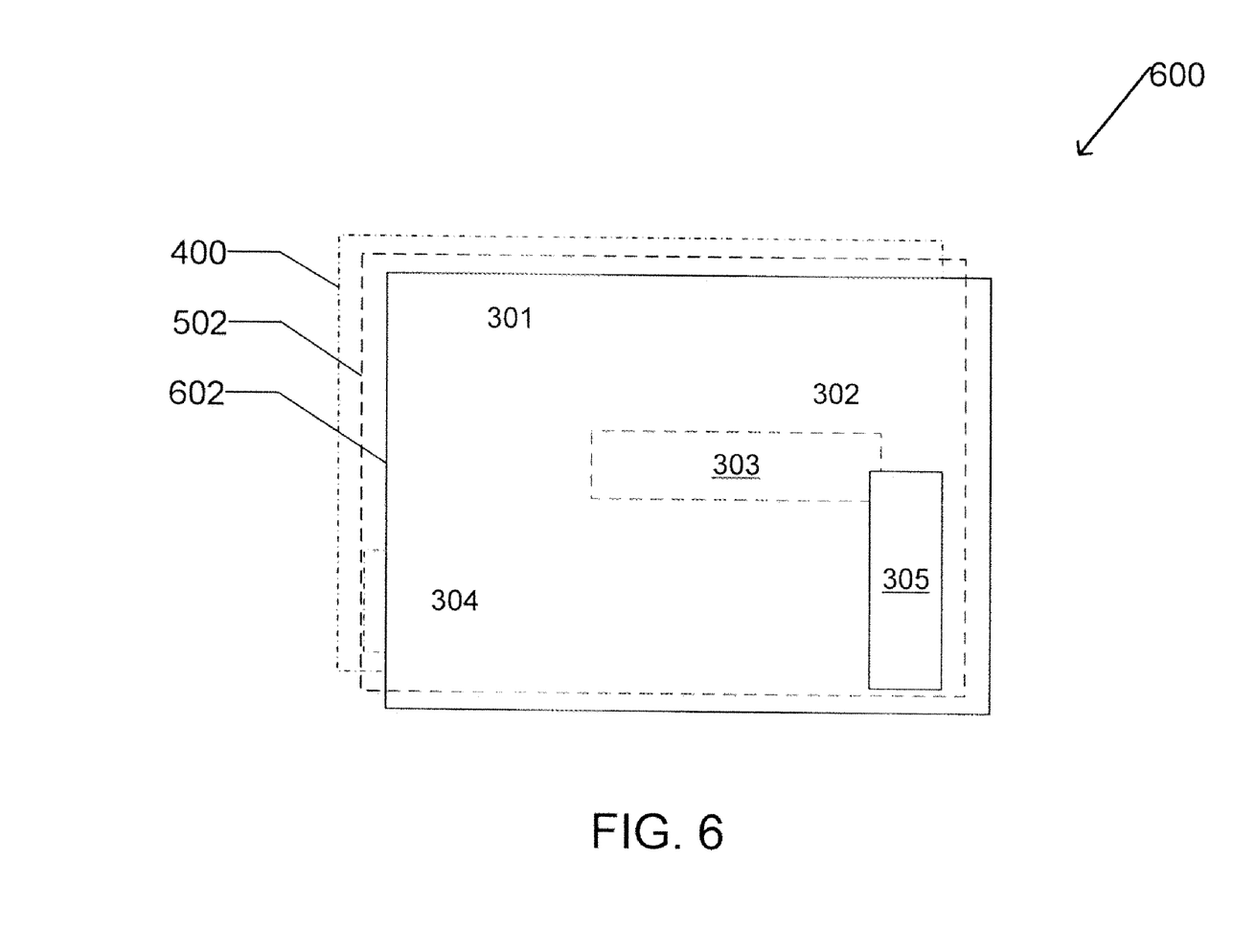
FIG. 6 illustrates a stack of panes including the stack of panes of FIG. 5 configured in accordance with an embodiment of the invention.

FIG. 6 illustrates a set of panes 600 including the pane 400 of FIG. 4 and the pane 502 of FIG. 5. When the document object 305 is passed to the topmost pane of the pre-rendering region 502, it is found to overlap the document object 303. A new topmost pane 602 is created and the document object 305 is associated with it.

Figures 7A, 7B, 7C:
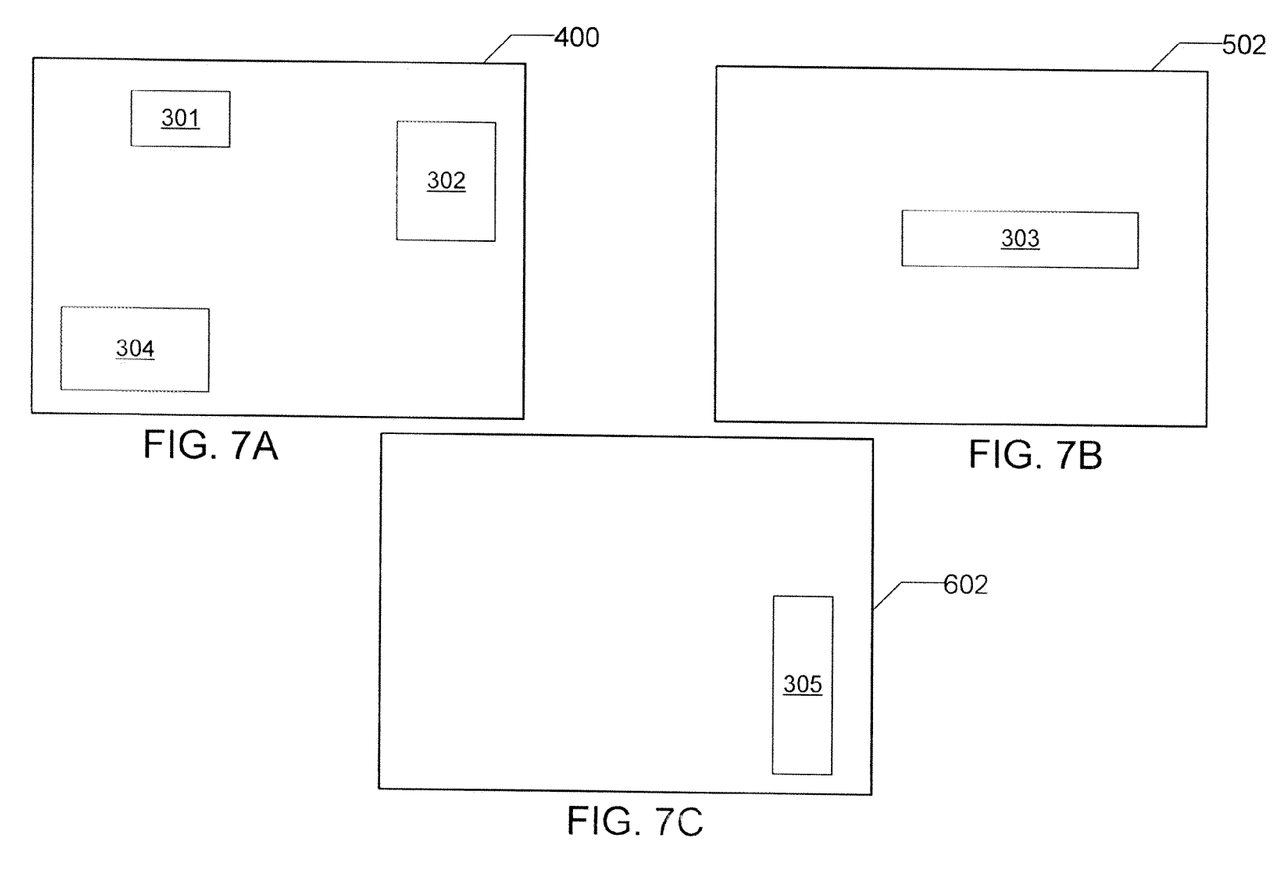
FIGS. 7A, 7B and 7C illustrate individual panes associated with a stack of panes processed in accordance with an embodiment of the invention.

FIGS. 7A, 7B and 7C illustrate the resulting panes 400, 502 and 602 and their respective associated document objects. It should be noted that each pane is associated with a set of non-overlapping document objects: pane 400 with document objects 301, 302 and 304; pane 502 with document object 303; and pane 602 with document object 305.

The groups of non-overlapping objects are rendered to their destination location (e.g., a screen, a metafile, a vector image, a Portable Document Format file, a text file, a bitmap, a printer) in order of their associated panes, e.g., the bottommost pane is rendered first and the topmost pane is rendered last. In an embodiment, the implemented optimization functions may render the document objects associated with a single pane in order of document object type (e.g., text, chart, table, map, watermark, graphic) or document object properties (e.g., size, font, color, style, transparency, language).

In an embodiment, the z-order indicates the pane layer of a document object. In this case, overlap is detected prior to receiving the set of document objects and thus, overlap does not need to be detected again. One pane is created for each z-order and all document objects associated with that z-order are associated with the equivalent pane.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
   accept a set of document objects, wherein each document object is associated with a z- order;
   pass a document object in the set of document objects to a pre-rendering region comprising a stack of at least two panes, wherein the document object is added in z- order;
   check the document object against each pane in the stack for document object overlap, beginning with a topmost pane, until a pane selected from one of a bottommost pane and an overlap pane is reached; and
   associate the document object with a pane selected from one of the bottommost pane and a pane above the overlap pane, wherein the pane above the overlap pane is selected from one of a pane in the stack and a new pane added to the top of the stack.

2. The computer readable storage medium of claim 1, herein he document object is added to the bottommost pane when there is no overlap pane.

3. The computer readable storage medium of claim 1, further comprising executable instructions to render the set of document objects in order from the bottommost pane to the topmost pane.

4. The computer readable storage medium of claim 3, wherein the set of document objects is rendered to a location selected from a screen, a metafile, a vector image, a Portable Document Format file, a text file, a bitmap, and a printer.

5. The computer readable storage medium of claim 3, wherein the set of document objects in a single pane is rendered in order of type of the document object and a set of document object properties.

6. The computer readable storage medium of claim 5, wherein each document object has an associated type selected from text, chart, table, map, watermark, and graphic.

7. The computer readable storage medium of claim 5, wherein each document has an associated set of document object properties selected from one or more of size, font, color, style, transparency, and language.

* * * * *